Feb. 26, 1935.  E. F. STOVER  1,992,552
REGULATING VALVE
Filed Jan. 23, 1931  2 Sheets-Sheet 2
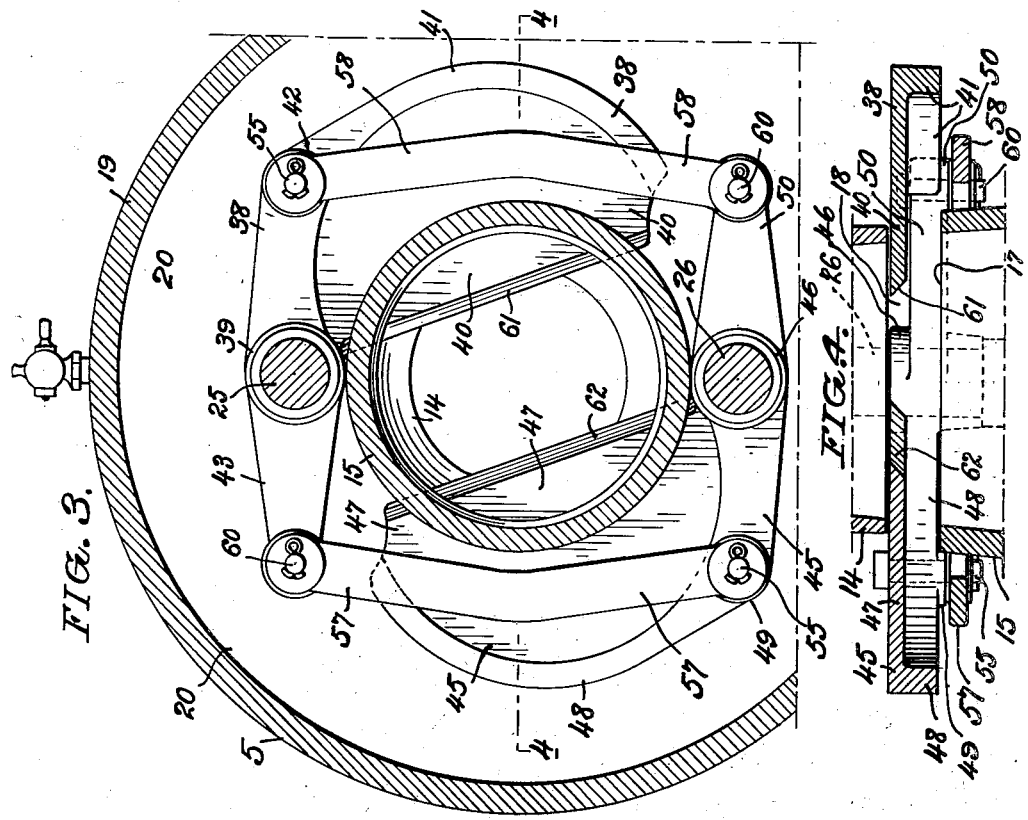
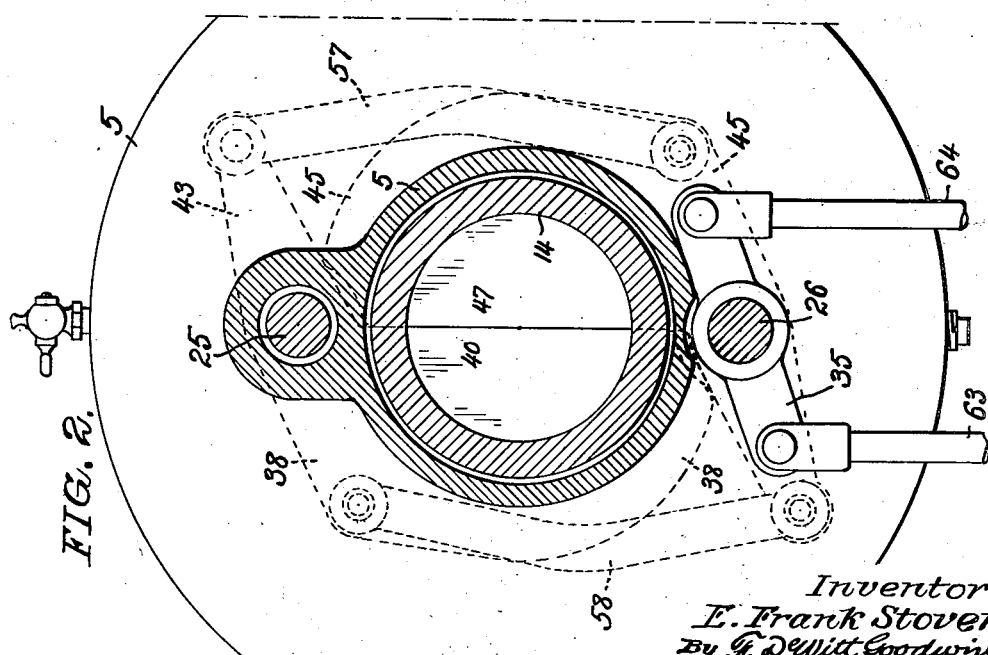
Inventor:
E. Frank Stover
By F. DeWitt Goodwin
Attorney

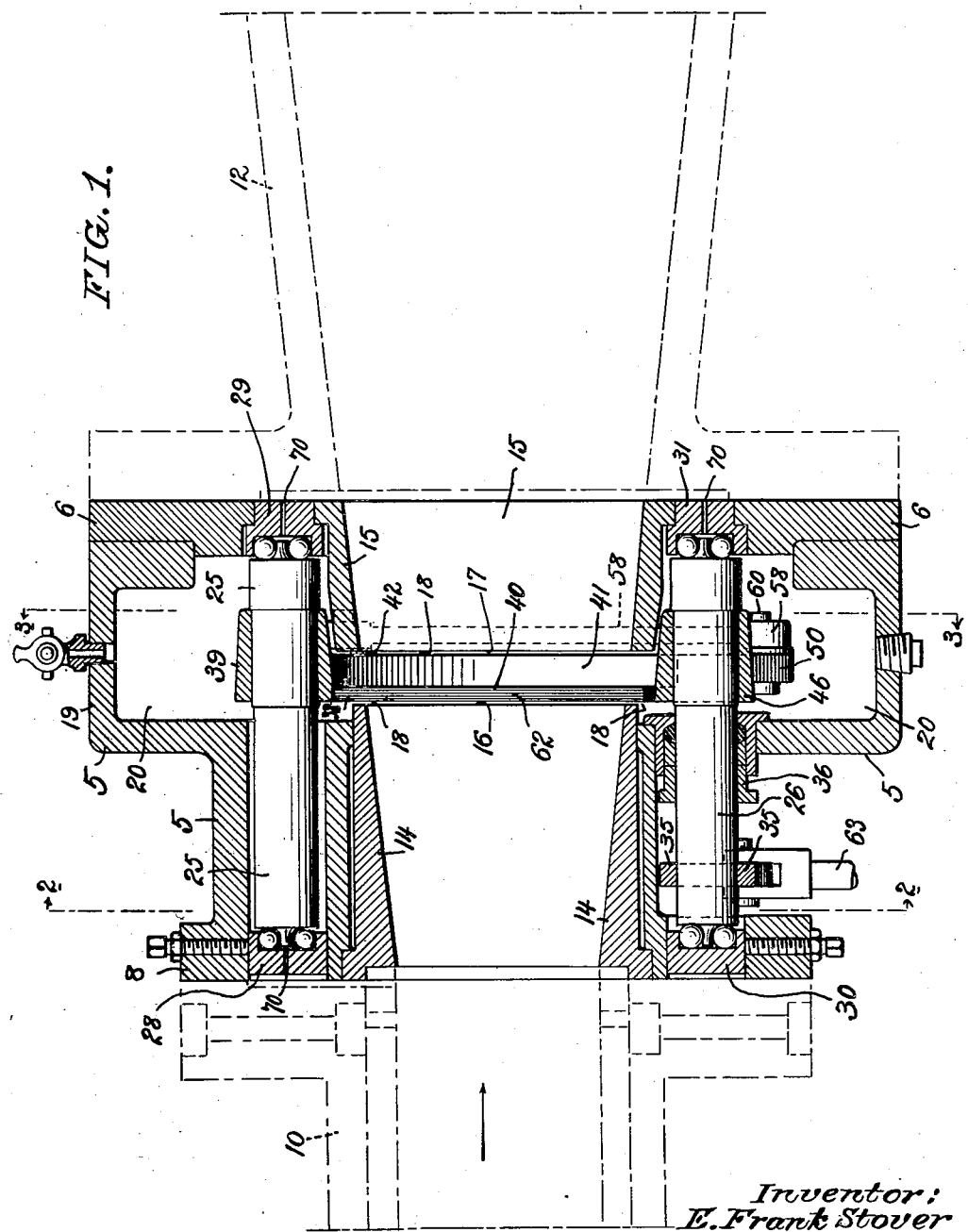

Patented Feb. 26, 1935

1,992,552

UNITED STATES PATENT OFFICE 1,992,552

REGULATING VALVE

Emory Frank Stover, Philadelphia, Pa.

Application January 23, 1931, Serial No. 510,607

8 Claims. (Cl. 277—1)

My invention relates to improvements in a regulating valve, and particularly to a balanced valve for use in systems where it is desired to control the rate of flow of liquids, and which is particularly adapted for use in filter plants for controlling the rate of water through the filter bed or for controlling the rate of wash water through the filter beds and also for controlling the rate of flow of liquids in chemical processes where it is desired to maintain a uniform flow of different liquids which are to be mixed in given proportions, or as a head control valve where the rate of supply may be variable and it is desired to maintain a constant head.

The object of my invention is to provide a balanced valve which will not be thrown out of balance by the action of the liquid flowing through the valve; a further object is to construct a valve having symmetrical movable valve plates, and operating parts, constructed in such a manner that the movable parts counterbalance each other; a further object is to arrange the valve plates and the casing surrounding the valve plates in such a manner that the pressure of liquid flowing through the valve will not tend to move the valve plates from a fixed position; a further object is to provide valve plates which are movable to and from each other and extending in a plane at right angles to the passageway through which the liquid flows and to mount the valve plates upon shafts located at diametrically opposite positions outside said passageway; a further object is to provide thrust bearings in which the shafts are mounted so that the valve plates are entirely carried by the shafts and are not in contact with the ends or facing surfaces of the pipe sections through which the liquid flows; a still further object is to provide means for operatively connecting the valve plates for moving the same in opposite directions for opening and closing the passageway through the pipes and to provide means for operating the valve plates from without the casing.

These together with various other novel features of construction and arrangement of the parts, which will be more fully hereinafter described and claimed constitute my invention.

Referring to the accompanying drawings Fig. 1 is a longitudinal sectional view of the valve embodying my invention; Fig. 2 is a transverse sectional view on line 2—2, Fig. 1; Fig. 3 is a transverse sectional view, as on line 3—3, Fig. 1; and Fig. 4 is a partial horizontal sectional view, as on line 4—4, Fig. 3.

In the accompanying drawings in which like reference characters refer to like parts, 5 represents the valve casing having a detachable cover 6, and a flange 8 at the end of the casing opposite to said cover. Said cover and said flange form means for the attachment of connecting pipes 10 and 12, shown in dotted lines, forming part of a system in which the valve is to be used.

Within the casing 5 are secured pipe sections 14 and 15, which in the present embodiment are of conical formation and form part of the passageway for directing the flow of liquid through the valve. The pipe sections 14 and 15 are arranged so that their adjacent ends or facing surfaces 16 and 17 are in spaced relation to each other and form a space 18 extending in a plane at right angles to the axis of the pipe sections. The casing 5 is provided with an enlarged portion 19 forming an annular chamber 20 surrounding the space 18 formed between the adjacent ends of the pipe sections.

Shafts 25 and 26 are rotatably mounted upon the casing 5 and extend within the chamber 20. Said shafts are located outside of the pipe sections 14 and 15 and at diametrically opposite points relatively to the longitudinal axis of said sections. The casing 5 is provided with friction reducing end thrust bearings 28, 29, 30 and 31 in which the shafts are mounted. The shaft 26 extends outside of the chamber 20 of the casing and has secured thereto an arm or lever 35 for rotating the shaft and operating the valve parts. The casing 5 is provided with a stuffing box 36 through which the shaft 26 extends from the interior of the chamber 20 to without the casing. The shaft 25 is entirely enclosed within the casing 5.

Upon the shaft 25 is mounted a valve plate 38 having a hub 39 rigidly secured to the shaft 25. The valve plate 38 consists of a blade portion 40 which occupies the space 18 formed between the adjacent ends or facing surfaces 16 and 17 of the pipe sections. Said plate 38 is provided with an enlarged outer rib 41, on which is formed a boss 42. An arm 43 is formed integrally with the plate 38 and is located upon the opposite side of the hub 39. A similar valve plate 45 is provided with a hub 46 rigidly secured upon the shaft 26. Said valve plate 45 is also provded with a blade portion 47, an enlarged outer rib 48 on which is formed a boss 49, and an arm 50. Said bosses 42 and 49 have pivot pins 55 on which are mounted links 57 and 58.

The arms 43 and 50 form extensions upon the valve plates, said arms are provided with pivot pins 60 located at the same radius from the shafts 25 and 26 respectively, as the pivot pins 55, and said pins 55 and 60 are located at diametrically opposite positions relatively to the shaft with which they are associated. One end of each link 57 or 58 is loosely mounted on a pivot pin 60 on the extension arms. The valve plates, the connecting links and the arms are of similar construction and arranged so that they will be diametrically opposite to each other relatively to the axis of the pipe sections 14 and 15 in all positions of the valve plates, as the latter are moved transversely to the pipe sections for regulating the flow of fluid through the latter.

When the valve plates 38 and 45 are closed, as shown in Fig. 2, the blade portions 40 and 47 abut against each other thus reducing the flow of liquid through the pipe sections. The adjacent edges of the blade portions 40 and 47 of the valve plates are of relatively thin formation and are also provided with beveled surfaces 61 and 62 formed upon the down stream side of the valve plates, as indicated by the arrow, Fig. 1. This construction of the valve plates reduces the tendency of the fluid in passing between the blade portions, to move the valve plates. The rib portions 41 and 48 of the valve plates are of substantially semicircular form thus conforming with the outside of the pipe sections 14 and 15, as clearly illustrated in Figs. 3 and 4. Said ribs 41 and 48 are provided for adding rigidity to the relatively thin blade portions. The ribs are located upon the down stream side of the valve plates so that the valve plates will present an unobstructed surface adjacent to the facing surface 16 for the free passage of the leakage fluid between the valve plates and the facing surface 16, into the enlarged chamber 20, where the ribs of the valve plates are located, thus the dynamic action of the leakage fluid will not impinge against the ribs and unbalance the valve plates.

The blade portions of the valve plates are located relatively closer to the facing surface 16 than to the facing surface 17, thus reducing the space through which the leakage fluid may pass around the facing surface 16 into the chamber 20, and providing a relatively larger space for the free passage of the fluid from the chamber 20 around the facing surface 17 on the down stream side of the valve plates.

The operating arm or lever 35 which is secured to the shaft 26 may be operated by connecting rods 63 and 64, shown in Fig. 2, from any suitable mechanism, well known in the art.

In the present embodiment of my invention the valve and the pipe sections are constructed as part of the recovery cone of a Venturi tube, and the valve plates may be opened or closed for regulating the rate of flow of liquid through the valve in the direction of the arrow.

Said pipe sections 14 and 15 may be of cylindrical form. When the valve plates are closed or partly closed the force of the fluid against the valve plates will be entirely taken by the shafts 25 and 26 on which the valve plates are secured, thus eliminating any frictional contact between the valve plates and the facing surfaces, or ends of the pipe sections. The thrust bearings 28, 29 and 31 may be provided with small central apertures 70 through which a circulation of liquid is maintained for preventing the accumulation of particles which would tend to retard the free rotation of the shafts and valve plates.

The operation of my invention is as follows:

The shaft 26 which extends without the casing 5 may be rotated for operating the valve plates 38 and 45. The valve plates are operatively connected so that they will move in opposite directions transversely relatively to the length of the pipe sections, and their movements will be uniform and simultaneous, and as all the movable parts are symmetrical, and positioned diametrically opposite to each other, they will counterbalance each other, thus insuring the valve plates remaining in any position, for regulating the flow of liquid through the valve. The adjacent edges of the valve plates are always positioned at equal distances from the center of the passageway through the pipe sections, thus insuring the flow of liquid being symmetrical relatively to the axis of the passageway. By my improved construction of the valve plates the tendency of the dynamic action of the fluid to move the valve plates is eliminated, thus insuring the valve plates remaining in any given position, and permitting the valve plates to be operated by a very small force applied to the operating connecting rods 63 and 64.

I claim:

1. A regulating valve comprising a casing having inlet and outlet openings forming a passageway through the casing, a facing surface upon the casing surrounding the passageway, said facing surface positioned transversely relatively to the passageway, valve plates pivotally mounted within the casing and movable into and out of said passageway in a plane parallel with said facing surface, a pair of identical links arranged in parallel relation to each other, a pair of pivot pins operatively associated with each plate, the pins associated with each plate being located at diametrically opposite points relatively to the pivot point of the associated plate, said pair of links having their corresponding ends connected with the pair of pivot pins associated with one plate and their opposite ends connected with the pair of pins associated with the opposite plate, whereby a movement imparted to one of said plates will impart an equal and opposite movement to the other of said plates for opening and closing said passageway, and means operatively associated with one of said plates for rotating the same.

2. A regulating valve comprising a casing having inlet and outlet openings forming a passageway for fluid through the casing, a facing surface upon the casing surrounding the passageway, said surface positioned transversely of the passageway, said casing having a portion surrounding the facing surface, valve plates pivotally mounted within the casing and movable in a plane parallel with said facing surface, said plates located adjacent to and in spaced relation to said facing surface, said plates being of substantially semicircular form arranged to abut against each other at the center of said passageway for closing the latter, stiffening ribs formed upon the peripheral portions of said plates, said ribs located upon the side of the plates opposite to said facing surface and out of the course of the leakage fluid passing between the plates and the facing surface to prevent the unbalancing of said plates due to the dynamic force of said leakage fluid, means operatively associated with one of the plates for rotating the same, and means operatively associating the valve plates whereby a movement imparted to one will actuate the other of said plates for opening and closing said passageway.

3. A regulating valve comprising a casing, pipe sections in axial alignment having their ends terminating in spaced relation to each other within the casing, shafts rotatably mounted upon the casing, said shafts located diametrically opposite to each other relatively to the axis of said sections and extending parallel with the longitudinal axis of the latter, a valve plate rigidly mounted upon each shaft and movable in a plane extending at right angles to the longitudinal axis of said sections and arranged to occup the space between said sections, means rigidly associated with each shaft upon which means two pivot pins are mounted at equal distances from and at diametrically opposite points relatively to the associated shaft, a pair of links arranged in parallel relation to each other and having their corresponding ends connected with the pivot pins associated with the opposite shafts, and means operatively associated with one of said shafts for moving said plates.

4. A regulating valve comprising a casing, pipe sections in axial alignment having their adjacent ends terminating in spaced relation to each other within the casing, shafts rotatably mounted in the casing, said shafts located diametrically opposite to each other relatively to the axis of said sections and extending parallel with the axis of the latter, a valve plate rigidly mounted upon each shaft and movable within the casing in a plane extending at right angles to the axis of the sections, said plates having edge portions arranged for entering the space formed between the ends of the sections, a pair of links arranged in parallel relation to each other, an extension arm upon each plate, a pivot pin upon the free end of each arm, a pivot pin upon each plate, the pivot pins upon a plate and upon the associated arm located at diametrically opposite points relatively to and equally distant from the shaft with which they are associated, each link connected with a pivot pin upon an arm and with a pin upon an opposite plate, said plates, arms, and links forming a parallelogram of symmetrical formation arranged for counter-balancing the weight of the plates, arms and links, and means operatively associated with said plates for moving the same to vary the size of the passageway through the sections.

5. A regulating valve comprising a casing, pipe sections in axial alignment having their ends terminating in spaced relation to each other within the casing, said casing forming a chamber surrounding the adjacent ends of said sections, shafts positioned at diametrically opposite sides of said sections and extending in parallel relation with the longitudinal axis of the latter, bearings mounted upon the casing in which the ends of the shafts are rotatably mounted, valve plates rigidly secured upon said shafts and located within said chamber, said valve plates movable in a plane parallel with the adjacent ends of said sections arranged for opening and closing the passageway through said sections, said valve plates when in the closed position located adjacent to and in spaced relation to the end of one of said sections through which space the leakage fluid may pass around the valve plates into said chamber, said bearings having apertures formed through the same for the passage of liquid through the bearings, and means operatively associated with said valve plates for rotating the same.

6. A regulating valve comprising a casing, pipe sections in axial alignment having their ends terminating in spaced relation to each other within the casing, shafts rotatably mounted in the casing, said shafts located diametrically opposite to each other relatively to the axis of said sections, said shafts extending longitudinally relatively to the axis of the sections, a valve plate rigidly mounted upon each of said shafts and movable in a plane extending at right angles to the length of said sections, said valve plates having edge portions arranged for entering the space formed between the ends of said sections, a pivot pin upon each plate, an extension arm rigidly associated with each plate, a pivot pin upon each arm and located in alignment with said pivot pin upon the plate and with the shaft on which the same plate and arm are mounted, a pair of links arranged in parallel relation to each other, each link connected with a pivot pin upon one arm and a pivot pin upon the opposite plate, said arms, links and plates forming a parallelogram for insuring the simultaneous movements of the valve plates in opposite directions, and means extending without the casing and operatively associated with one of said shafts for rotating the same.

7. A regulating valve comprising a casing, pipe sections arranged in axial alignment having their ends terminating in spaced relation to each other within the casing, said casing having an enlarged portion forming a chamber surrounding the adjacent ends of said sections, shafts rotatably mounted upon the casing, said shafts located in the chamber formed in the casing surrounding said sections, valve plates secured upon said shafts, said valve plates having relatively thin blade portions arranged to enter the space between the ends of said sections and abut against each other for closing the passageway through said sections, said plates having enlarged ribs formed thereon located outside of said sections, a pivot pin upon the rib of each plate, an extension arm rigidly associated with each plate, a pivot pin upon each arm and located in alignment with the pivot pin on the rib and with the shaft on which the same plate and arm are mounted, a pair of links arranged in parallel relation to each other, each link connected with a pivot pin of one arm and the pivot pin on the rib of the opposite plate, said arms, links and ribs forming a parallelogram for insuring the simultaneous movements of the valve plates in opposite directions, and means extending without the casing operatively associated with one of said shafts.

8. A regulating valve comprising a casing, pipe sections mounted in axial alignment having their ends terminating in spaced relation to each other within the casing, valve plates movably mounted within the casing in a plane at right angles to the axis of said sections arranged for entering the space formed between the adjacent ends of the sections, said valve plates located in closer relation to the end of one of the sections than to the end of the other one of the sections for providing a greater clearance space on one side of the valve plates than on the other side, said plates having beveled portions formed thereon arranged adjacent to the edges of the plates which abut when the valve plates are closed, and said valve plates having said beveled portions located on the side thereof having the greatest clearance space between the plates and the ends of said sections.

E. FRANK STOVER.